Figure 1:
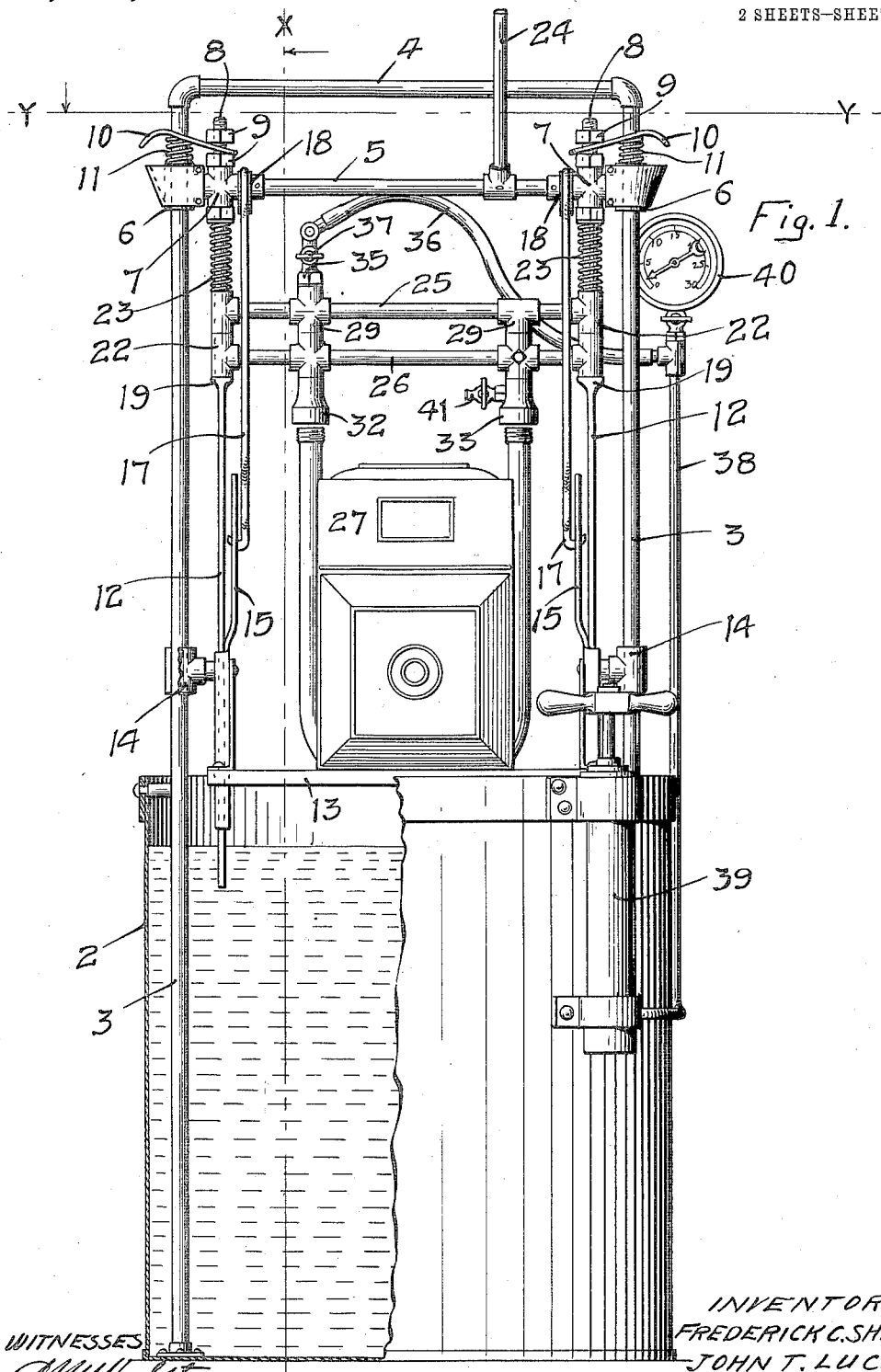

F. C. SHEPARD & J. T. LUCAS.
METER TESTING APPARATUS.
APPLICATION FILED FEB. 12, 1912.

1,049,541.

Patented Jan. 7, 1913.
2 SHEETS—SHEET 1.

WITNESSES

INVENTORS
FREDERICK C. SHEPARD
JOHN T. LUCAS
BY Paul & Paul
ATTORNEYS

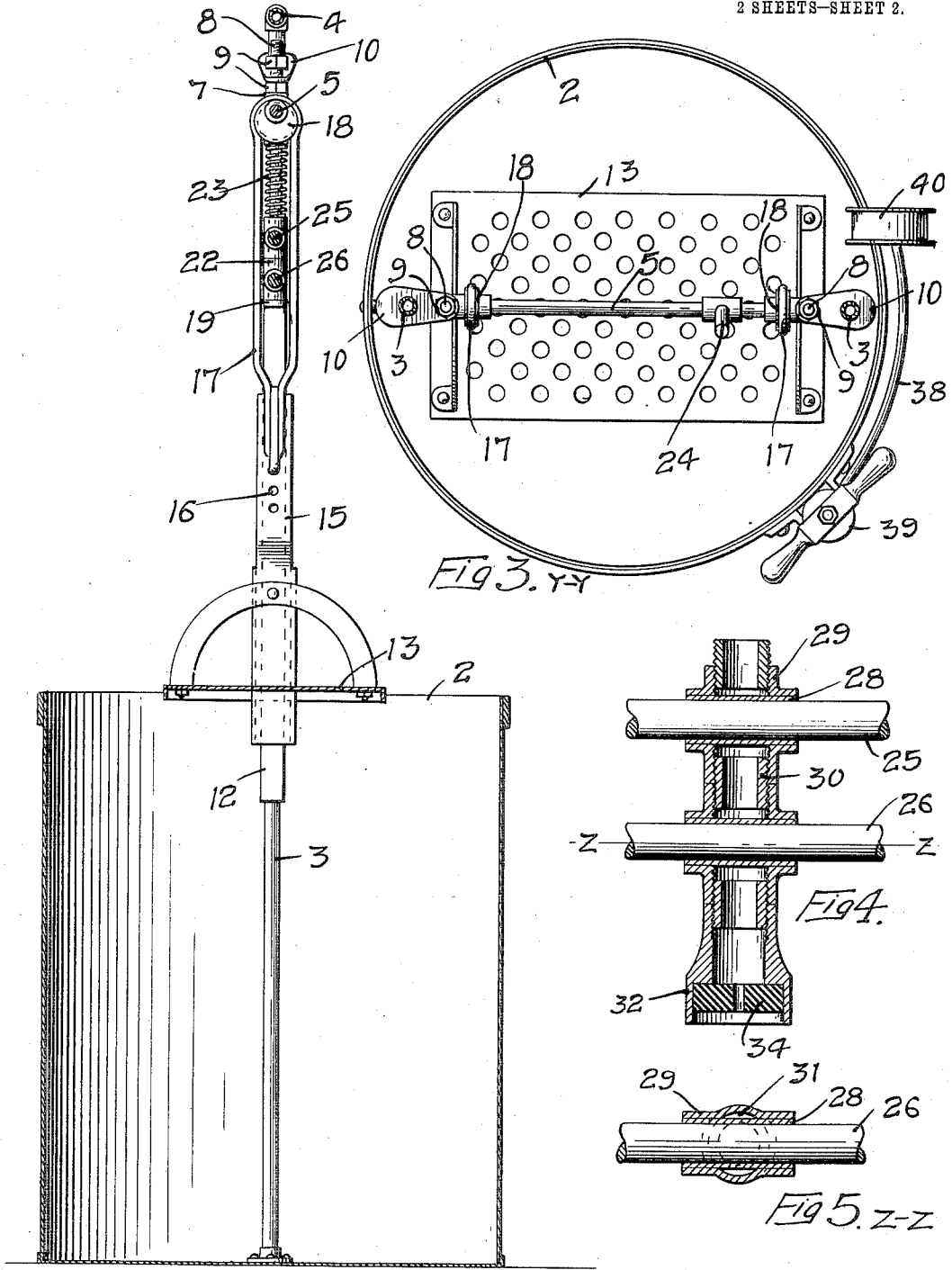

UNITED STATES PATENT OFFICE.

FREDRICK C. SHEPARD AND JOHN THOMAS LUCAS, OF MINNEAPOLIS, MINNESOTA.

METER-TESTING APPARATUS.

1,049,541.          Specification of Letters Patent.          Patented Jan. 7, 1913.

Application filed February 12, 1912. Serial No. 676,957.

*To all whom it may concern:*

Be it known that we, FREDRICK C. SHEPARD and JOHN THOMAS LUCAS, of Minneapolis, Hennepin county, Minnesota, have invented certain new and useful Improvements in Meter-Testing Apparatus, of which the following is a specification.

In testing gas meters it has been customary to apply air under pressure, and then partially or wholly submerge the meter in water to determine whether there is a leak in the meter or in any part of the meter mechanism. The means for carrying out this test have been crude and imperfect, requiring considerable time and labor and adding quite materially to the expense of the meter department.

The object of our present invention is to provide an apparatus by means of which a meter can be easily and quickly tested.

A further object is to provide an apparatus of simple, durable construction and one which will be thoroughly effective for meter-testing purposes.

The invention consists generally in various constructions and combinations, all as hereinafter described and particularly pointed out in the claims.

In the accompanying drawings forming part of this specification, Figure 1 is a front elevation, partially in section, of a meter testing apparatus embodying our invention, Fig. 2 is a vertical sectional view on the line x—x of Fig. 1, Fig. 3 is a horizontal sectional view on the line y—y of Fig. 1, Fig. 4 is a detail sectional view, showing the device for connecting the air supply with the meter, Fig. 5 is a sectional view on the line z—z of Fig. 4.

In the drawing, 2 represents a tank having an open top adapted to contain a quantity of water.

3 are upright rods, extending preferably to the bottom of the tank and secured thereto and connected at the top with one another by a cross bar 4. A meter carrier is vertically slidable on these rods and consists of a cross bar 5 having guides 6 at each end which are slidable on the rods 3. Between the cross bar 5 and the guides 6 we provide cross fittings 7 having bearings in which the cross bar 5 is adapted to rotate, and supporting vertically arranged rods 8 having nuts 9 at their upper ends. Between the nuts 9 arms 10 are provided, loosely fitting on the rods 8 and adapted to slide on the rods 3 and held in a raised position by springs 11. These arms operate as clutches or clamps to support the meter carrier at any point on the rods 3 in which it may be set, the springs causing the arms to assume a position on the rods substantially as shown in Fig. 1. The rods 8 have flattened lower portions 12 on which a carrier platform 13 is vertically slidable, said platform having guides 14 which are slidable on the rods 3. Straps 15 are attached to the carrier platform and have a series of holes 16 therein, one above another, adapted to receive eccentric straps 17, the upper ends of which bear on eccentrics 18 mounted on the ends of the rod 5. The rods 8 have stops 19 thereon between the upper rounded portions and the lower flattened portions and a cross head 22 is vertically slidable on said rounded portions and is normally seated against the stops 8 by the tension of springs 23 mounted on said rounded portions between the cross head and the cross fittings 7. An operating lever 24 is mounted on the rod 5 and when this lever is moved to rotate the said rod and its eccentrics the strain will be applied to the straps 17 to draw up the meter platform and the meter thereon will engage the cross head and raise it against the tension of the springs 23. The cross head is preferably provided with cross bars 25 and 26 arranged parallel, substantially, with one another and serving to brace and stiffen the cross head and hold the meter fittings against lateral oscillation. The meter 27 is interposed between this cross head and the platform. Any suitable means may be provided for connecting the cross head with the meter to supply air thereto, but we prefer to use the apparatus substantially as shown in Figs. 4 and 5.

28 represents sleeves arranged within cross fittings 29 and slidable on the rods 25 and 26, the cross fittings being connected by suitable nipples 30. Between the cross fittings and the sleeves 28 passages 31 will be formed through which the air may pass from the supply pipe to the meter.

32 and 33 represent cups connected to the cross head fittings and having linings 34 of yielding material to form air-tight joints with the meter connections, as indicated plainly in Fig. 1.

One of the fittings 29 has a connection 35 to which an air hose 36 may be attached, said connection having a valve 37 which controls the admission of air to the meter. This air hose may lead to a suitable source of air pressure, such as a tank or reservoir, or where a plant is not equipped with an air pressure system, we may connect the hose 36 with a pipe 38 leading to a hand pump 39, a gage 40 being provided in connection with the pipe 38 to indicate the air pressure.

One of the fittings of the cross bars 25 and 26 is adapted to slide lengthwise thereon to adapt the cross head to meters of different sizes, and we prefer also to equip the cup 33 with a valve cock 41 by means of which the air pressure may be relieved to equalize the pressure, or in case there is danger of rupturing the meter bellows, or when it is desired to pass the air through the meter to operate the indicators and ascertain if the meter is registering properly.

In using the apparatus, the meter to be tested is placed on the platform 13, the fittings of the cross head secured to the meter, and the carrier moved down until the meter is partially or wholly submerged. It will be understood that the lower portion of the meter may first be submerged and then, when the air is turned on, if there is a leak in the bottom of the meter it will be instantly apparent by the bubbles rising to the top of the water. The meter may then be forced down gradually until it is entirely submerged, and the point where the bubbles, if any, rise, will indicate the location of the leak. Only one movement of the lever 24 is necessary to lock the meter and the return movement of the lever releases it, consequently no time is lost in securing up fittings or making adjustments by means of wrenches, as is usually done in the meter testing operation.

We claim as our invention:—

1. The combination, with a tank having an open top and adapted to contain a supply of water, of a vertically movable meter carrier, guides therefor, fluid pressure connections for attachment to the meter, the downward movement of said carrier submerging the meter in the water in said tank and means for locking said carrier in its submerged position.

2. The combination, with a tank having an open top and adapted to contain a supply of water, of a vertically slidable meter carrier and guides therefor, fluid pressure connections for attachment to a meter, said carrier being moved down by pressure of the hands into said tank and a locking device for holding said carrier and the meter thereon in a submerged position in said tank.

3. The combination, with a tank having an open top, of a meter carrier vertically slidable therein and including a platform, a cross head between which and said platform the meter is placed, said cross head having meter connections and a connection with a source of fluid pressure supply, said connections being adjustable to adapt them to meters of different width.

4. The combination, with a tank having an open top and adapted to contain a supply of water, of a meter carrier slidable in said tank and including a relatively movable meter platform and cross head between which the meter to be tested is placed, said cross head having means for connection with a meter and a connection with a fluid pressure supply, and an eccentric mechanism for clamping said cross head connections on the meter.

5. A meter testing apparatus comprising a carrier having a cross head, fittings mounted on said cross head, one of said fittings having a connection with a source of fluid pressure supply, the other fitting having a valve-cock, whereby the fluid under pressure in the meter may be relieved or allowed to flow through the meter to test the meter indicators.

6. The combination, with a tank having an open top and adapted to contain a supply of water, of a meter carrier vertically slidable in said tank and including a platform whereon the meter to be tested is placed, fluid pressure fittings having cups to receive the meter connections, one of said fittings having means for connection with a fluid pressure supply, means for clamping said cups on said meter connections, the downward movement of said carrier gradually submerging the meter within the water in said tank.

7. The combination, with a tank adapted to contain a supply of water and having an open top, of a meter carrier slidable therein, said carrier having a platform to receive a meter, meter fittings having fluid pressure connections, means for clamping a meter on said carrier, guides for said carrier, and clutches for automatically locking said carrier on said guides at any point in its movement thereon.

8. The combination, with a tank having an open top and adapted to contain a supply of water, of a meter carrier vertically slidable therein, means for clamping a meter on said carrier, fluid pressure connections for said meter, and means for locking said carrier at any point of its movement within said tank.

9. The combination, with a tank having an open top and adapted to contain a supply of water, of a meter carrier, a cross head, guides for said carrier and cross head, fittings mounted on said cross head for connection with a meter and communicating with a source of fluid pressure supply, and means for adjusting said carrier and cross head with respect to one another to adapt them for meters of different height said means including eccentrics and adjustable straps therefor.

10. The combination, with a tank adapted to contain a quantity of water, of a meter carrier vertically slidable therein, fittings having means for connection with a meter seated on said carrier and communicating with a source of fluid pressure supply, a cross head whereon said fittings are mounted and means for depressing said cross head to move said fittings into engagement with meter connections.

11. The combination, with a tank having an open top and adapted to contain a quantity of water, of a meter carrier slidable therein, fittings having means for connection with a meter and communicating with a source of fluid pressure supply, a rock shaft, eccentrics thereon, straps for said eccentrics connected with said carrier, the rocking of said shaft operating to tighten said fittings and clamp the meter on said carrier.

12. The combination, with a tank having an open top and adapted to contain a supply of water, of a meter carrier slidable therein, a cross head mounted on said carrier and having fittings for connection with a meter and communicating with a source of fluid pressure supply, a shaft mounted in said carrier, eccentrics mounted on said shaft, and straps adjustably connecting said eccentrics with said carrier, the rotation of said shaft operating to tighten said fittings on a meter and the adjustment of said straps adapting said carrier for meters of different height.

13. The combination, with a tank having an open top, and adapted to contain a quantity of water, of a meter carrier slidable therein, a cross head mounted in said carrier and having fittings for connection with a meter and communicating with a source of fluid pressure supply and means for yieldingly holding said fittings in engagement with said meter connections and clamping the meter on said carrier.

14. The combination, with a tank having an open top and adapted to contain a supply of water, of a meter carrier vertically slidable therein, means for clamping a meter on said carrier, and fittings having means for engagement with said meter connections, one of said fittings having a connection with a source of fluid pressure supply, the other fitting having a valve cock, whereby the fluid under pressure may be relieved or allowed to flow through the meter and test the meter indicators.

In witness whereof, we have hereunto set our hands this 6" day of February 1912.

FREDRICK C. SHEPARD.
JOHN THOMAS LUCAS.

Witnesses:
LILLIAN E. WILLIAMS,
LILLIAN M. TRAFTON.